United States Patent [19]

Jones et al.

[11] Patent Number: 4,851,048

[45] Date of Patent: * Jul. 25, 1989

[54] STRUCTURED KAOLIN PIGMENT AND PROCESS FOR MANUFACTURE THEREOF

[75] Inventors: J. Philip E. Jones; Jorgé E. Salinas, both of Sandersville; Keryn N. Geho, Canton; Weyman H. Dunaway, Sandersville; Rasik H. Raythatha, Tennille, all of Ga.

[73] Assignee: E.C.C. America Inc., Atlanta, Ga.

[*] Notice: The portion of the term of this patent subsequent to Apr. 11, 2006 has been disclaimed.

[21] Appl. No.: 910,338

[22] Filed: Sep. 19, 1986

Related U.S. Application Data

[63] Continuation-in-part of Ser. No. 754,475, Jul. 12, 1985, abandoned, which is a continuation-in-part of Ser. No. 493,356, May 10, 1983, abandoned.

[51] Int. Cl.$^4$ .......................... C09C 1/00; C09C 3/00; C04B 33/04; C04B 14/00
[52] U.S. Cl. .................................... 106/446; 501/146; 501/147; 501/150; 501/148; 162/135; 162/181.6; 162/181.8; 162/181.7; 106/463; 106/464; 106/468; 106/484; 106/485; 106/486
[58] Field of Search ..................... 106/288 B, 299, 306, 106/309, 308 R, 308 C, 308 M, 308 Q, 501/146, 150, 147, 148

[56] References Cited

U.S. PATENT DOCUMENTS

| | | | |
|---|---|---|---|
| 2,347,496 | 4/1944 | Muskat et al. | 106/302 |
| 4,030,941 | 6/1977 | Kunkle et al. | 106/288 B |
| 4,299,807 | 11/1981 | Arpl et al. | 501/150 |
| 4,346,178 | 8/1982 | Economer | 106/288 B |
| 4,381,948 | 5/1983 | McConnell et al. | 106/288 B |
| 4,419,228 | 12/1983 | Cook et al. | 501/150 |
| 4,650,521 | 3/1987 | Kappelman et al. | 501/147 |
| 4,738,726 | 4/1988 | Pratt et al. | 501/147 |

FOREIGN PATENT DOCUMENTS 1176466 8/1964 Fed. Rep. of Germany ... 162/181.6

Primary Examiner—Howard E. Schain
Assistant Examiner—Garnette D. Draper
Attorney, Agent, or Firm—Klauber & Jackson

[57] ABSTRACT

A structured kaolinitic pigment having improved physical and optical characteristics when incorporated as a filler in paper. The pigment is also useful in paper coating applications. The pigment consists of porous aggregates of kaolin particles which are chemically bonded together. The pigment may be produced by chemically reacting a particulate kaolin with a metal chloride, such as silicon tetrachloride. The process is conducted under conditions such that the kaolinite structure is not impaired.

19 Claims, 1 Drawing Sheet

EFFECT OF PARTICLE SIZE ON LIGHT SCATTER

EFFECT OF PARTICLE SIZE ON LIGHT SCATTER

EFFECT OF ADDITION OF CALCIUM CARBONATE ON LIGHT SCATTER OF CHEMICALLY AGGREGATED KAOLINITE

STRUCTURED KAOLIN PIGMENT AND PROCESS FOR MANUFACTURE THEREOF

BACKGROUND OF INVENTION

This application is a continuation-in-part of application Ser. No. 754,475, filed July 12, 1985 now abandoned, which is a continuation-in-part of application Ser. No. 493,356, filed May 10, 1983, now abandoned.

This invention relates generally to kaolin products, and more specifically relates to a structured kaolin pigment and method of manufacture of same. The pigment is particularly useful as a filler in paper products, but also finds use in other applications, including in the coating of papers.

In the course of manufacturing paper and similar products, including paperboard and the like, it is well-known to incorporate quantities of inorganic materials into the fibrous web in order to improve the quality of the resulting product. In the absence of such "fillers", the resulting paper can have a relatively poor texture due to discontinuities in the fibrous web. The said fillers are also important in improving the printing qualities of the paper, i.e. by improving the surface characteristics of same. The use of appropriate such fillers, further, vastly improves the opacity and the brightness of a paper sheet of a given weight.

A number of inorganic materials have long been known to be effective for many of the aforementioned purposes. Among the best of these materials is titanium dioxide, which can be incorporated into the paper in the form of anatase or of rutile. Titanium dioxide, however, is among the most expensive materials which are so useable. Thus despite the effectiveness of such material as a filler, its use is limited and satisfactory replacements have been much sought after.

Among the materials which have found increasing acceptance as paper fillers are calcined kaolins. Materials of this type are generally prepared by calcining a crude kaolin which may have been initially subjected to prior beneficiation steps in order to remove certain impurities, e.g. for the purpose of improving brightness in the ultimate product. Reference may usefully be had to Proctor U.S. Pat. No. 3,014,836, and to Fanselow et al, U.S. Pat. No. 3,586,823, which disclosures are representative of the prior art pertinent to calcined kaolins.

Those properties which render a kaolin pigment particularly valuable for use as a filler are also well-known. These include a low abrasion value, and high brightness and opacifying characterisitics. The low abrasion is significant in order to assure that the resultant paper product may be manufactured and processed using conventional machinery without damaging same. The brightness and opacifying characteristics are important in producing an acceptable paper sheet, one which incorporates whiteness, high opacity, good printability, and light weight.

Both the brightness characteristics of the given kaolin and the opacifying properties of same when incorporated as a filler in paper, may be quantitatively related to a property of the filler identified as the "scattering coefficient S". The said parameter, i.e. the scattering coefficient S of a given filler pigment, is a property well-known and extensively utilized in the paper technology art, and has been the subject of numerous technical papers and the like. The early exposition of such measurements was made by Kubelka and Munk, and is reported in Z. Tech Physik 12:539 (1931). Further citations to the applicable measurement techniques and detailed definitions of the said scattering coefficient are set forth at numerous places in the patent and technical literature. Reference may usefully be had in this connection, e.g. to U.S. Pat. Nos. 4,026,726 and 4,028,173. In addition to the citations set forth in these patents, reference may further be had to Pulp and Paper Science Technology Vol. 2 "Paper", Chapter 3, by H. C. Schwalbe (McGraw-Hill Book Company, N.Y.).

It is well-known that in order to obtain high light scattering and opacity, the major portion of filler should be in the range of one micrometer. However, good light scatter cannot be achieved solely by using a kaolin having the said size characteristics: an essential further characteristic needed is that the kaolin be structured, i.e., formed from an assemblage of platelets interconnected or bonded to provide aggregates which include a network of the platelets.

Aggregation can be of interest for additional reasons. In particular, many kaolin crude reserves are considerably finer than preferred by the paper industry; i.e., they have an unduly high proportion of particles with E.S.D.'s below 0.25 micrometers. Typical Cretaceous kaolins, e.g., include 25 to 30% by weight of particles below 0.25 micrometers; and typical Tertiary kaolins can include 50 to 60% by weight of particles below 0.25 micrometers E.S.D. The presence of such large quantities of very fine particles can have detrimental effects upon paper strength, and in other respects are undesired by the paper manufacturer. While the said extreme fines can be removed by various separation processes, such as high speed centrifuging, such removal is very expensive and entails high capital investment; this quite aside from the possible loss of high proportions of the input feed.

One method for achieving aggregation is to utilize calcining. Thus, in U.S. Pat. No. 4,381,948 to A. D. McConnell et al, a calcined kaolin pigment is disclosed and a method for manufacture of same. The said pigment consists of porous aggregates of kaolin platelets, and exhibits exceptionally high light scattering characteristics when incorporated as a filler in paper. This pigment, which substantially corresponds to the commercially available product ALPHATEX® of the present assignee Anglo-American Clays Corporation (Atlanta, Ga.), is prepared by first blunging and dispersing an appropriate crude kaolin to form an aqueous dispersion of same. The blunged and dispersed aqueous slurry is subjected to a particle size separation from which there is recovered a slurry of the clay, which includes a very fine particle size; e.g. substantially all particles can be smaller than 1 micrometer E.S.D. The slurry is dried to produce a relatively moisture-free clay, which is then thoroughly pulverized to break up agglomerates. This material is then used as a feed to a calciner; such feed is calcined under carefully controlled conditions to typical temperatures of at least 900° C. The resulting product is cooled and pulverized to provide a pigment of the porous high light scattering aggregates of kaolin platelets as described.

Calcined kaolin products including those of the aforementioned ALPHATEX® type, while very effective as fillers and often possessing good light scattering characteristics, are seen to be manufactured by relatively complex techniques involving a multiplicity of steps, including specifically a calcining step, plus various preparatory steps and post-calcining steps. Thus the said product is relatively expensive to produce; and requires considerable investment in complex apparatus and the like—e.g. highly regulated calciners etc. It can indeed be noted that the conditions of preparation of these materials must be very carefully controlled in order to keep abrasion acceptably low in the calcined product. For example the calcination operation tends per se to produce an abrasive product—in consequence of overheating—if great care is not taken to preclude such a result.

It is further to be noted that in order to produce a low abrasion calcined product, the particle size in the feed to the calciner must be carefully controlled—even a relatively small increase in coarseness of such feed can have very marked detrimental effect on Valley abrasion.

It has heretofore been known to utilize uncalcined (sometimes referred to as "hydrous") kaolin both as paper fillers and for paper coating. Because the uncalcined material usually does not possess high light scattering qualities or good opacity, its usefulness, especially as a filler, is limited; and this (in addition to improving brightness) is indeed the particular advantage of calcined products of the ALPHATEX ® type; i.e. by virtue of the aggregated structures of same, high light scattering properties are provided and good opacity.

With respect further to terminology, it is noted that the prior art literature, including numerous of the prior art patents relating to the field of kaolin products and processing, often uses the term "hydrous" to refer to a kaolin which has not been subjected to calcination—more specifically, which has not been subjected to temperatures above about 450° C., which temperatures serve to impair the basic crystal structure of kaolin. These so-called "hydrous" clays may have been produced from crude kaolins, which have been subjected to beneficiation as, for example, to froth flotation, to magnetic separation, to mechanical delamination, grinding, or similar comminution, but not to the mentioned heating as would impair the crystal structure.

In an accurate technical sense, the description of these materials as "hydrous" is, however, incorrect. More specifically, there is no molecular water actually present in the kaolinite structure. Thus, although the structure can be (and often is) arbitrarily written in the form $2 H_2O.Al_2O_3.2SiO_2$, it is now well-known that kaolinite is an aluminum hydroxide silicate of approximate composition $Al_2(OH)_4Si_2O_5$ (which equates to the hydrated formula just cited). Once the kaolin is subjected to calcination, which, for the purposes of this specification means being subjected to heating of 450° C. or higher for a period which eliminates the hydroxyl groups, the crystalline structure of the kaolinite is destroyed. Therefore, such material, having been thus calcined, cannot correctly be referred to as a "kaolin". Accordingly, it should be appreciated that henceforth in this specification, when the term "kaolin" or "kaolinite" is utilized such term necessarily implies that the original structure of the material is intact. Thus, the term "kaolin" as used herein, can be considered to be equivalent to the technically inaccurate (but oft-occurring) prior art usage, "hydrous kaolin" or sometimes simply "hydrous clay."

From time to time, it has been proposed to provide structured kaolin agglomerates by methods unrelated to calcining, the objective being to produce a high light scattering pigment, one with good opacifying properties, without the need for calcination.

Thus, in U.S. Pat. No. 4,346,178 to Peter Economou, a structured kaolin agglomerate is disclosed wherein the clay platelets are stabilized or frozen in position by the addition thereto of a urea-formaldehyde prepolymer.

Further relevant art includes U.S. Pat. No. 4,072,537 to F. L. Kurrle. Disclosed therein is a composite silicate pigment prepared by a precipitation reaction where spherical hydrous metal silicate particles are precipitated on the planar surfaces of clay particles having a platelet-type structure. The metal silicate pigment component is comprised of the reaction product of a water soluble alkali metal silicate such as sodium silicate and a water soluble salt of a polyvalent metal, such as calcium chloride.

In U.S. Pat. Nos. 3,853,574; 3,864,140; and 3,856,545, all to Thomas H. Ferrigno, pigmentary compositions are disclosed wherein comminuted minerals such as kaolins are combined with inorganic binders, and formed into agglomerates, which when calcined produce compositions embodying numerous particles of the minerals bonded together and presenting internal voids and multiple light reflecting surfaces. The resulting pigmentary compositions are useful in applications requiring high visible light reflectance. These products, however, are, as indicated, produced by calcining, and based upon inorganic binders such as a glassy material, e.g. an alkali metal silicate or the like.

OBJECTS OF THE INVENTION

In accordance with the foregoing, it may be regarded as an object of the present invention, to provide a structured kaolin pigment product, which possesses improved light scattering characteristics, and hence is useful as an opacifier and light scattering filler for paper and paper products, and which may similarly be used in other paper manufacturing applications including in the coating of same.

It is a further object of the present invention, to provide a product of the foregoing character, which is prepared without calcination and therefore without subjecting the kaolin to high temperatures, and which accordingly possesses low abrasiveness in accordance with the kaolin feed from which it is produced.

It is a yet further object of the invention, to provide a pigmentary product of the foregoing character, which is composed of structured aggregates of minute kaolin particles which are bonded together chemically, i.e. without the use of calcination or other high temperature techniques.

It is a still further object of the invention to provide a high light scattering pigmentary kaolin product, which may be produced at lower costs than calcined kaolins, and which can therefore provide a lower cost replacement for many applications in which calcined kaolin products or other high cost fillers are presently utilized.

It is a yet further object of the invention, to provide a process for producing a pigmentary high light scattering kaolin product, which process utilizes chemical aggregation techniques, and may be carried out without the use of a calcining step or of other high temperature processing conditions or equipment.

It is a yet further object of the present invention, to provide a process for producing structured kaolin pigments as aforementioned, which consists of a minimal number of simply conducted steps, which utilize relatively simple and inexpensive apparatus, and which introduce minimal foreign elements into the final product produced by same.

A still further object of the invention is to provide a process for producing structured kaolin pigments as aforementioned, from a feed crude containing high percentages of extremely minute particles, e.g., less than 0.25 micrometers, to thereby convert a crude having limited value to the paper maker to one which can be readily and economically used in paper products.

A yet further object of the invention, is to provide a process as aforementioned, which enables low abrasion structured kaolin pigments to be produced from coarser process feeds than can normally be employed in calcination to produce a product of comparable low abrasion.

SUMMARY OF INVENTION

In accordance with the method of the present invention, a fine particle size kaolin feed is reacted in particulate form with a metal chloride, such as silicon tetrachloride, to form a chemically aggregated structured kaolin pigment. Free moisture present in the particulate feed is sufficient to hydrolyze the metal chloride, but below levels at which the metal oxide will precipitate. Free moisture present in the particulate feed is sufficient to initiate at least a partial hydrolysis of the metal chloride or chlorides. If the moisture level is too high, however, it can diminish or impair the efficiency of the aggregation process. Thus in the instances where silicon and/or titanium chlorides are used, if the moisture level is too high relative to the metal chloride(s), then the hydrolysis products from the metal chlorides will predominantly precipitate as the metal oxide, i.e. as silica gel and/or titania. In the case of aluminum trichloride, if the moisture level is too high relative to the metal chloride, then the dilution of the finally resulting aluminum hydroxide (in the presence of ammonia) can be so high as to cause inefficient aggregation. In the instance of the silicon and titanium chlorides, the water to metal chloride molar ratio should be at least 0.23, and generally less than about 50, with from about to 1 to 10 being a preferable molar ratio range. Where aluminum trichloride is used the lower limits of moisture are as indicated for silicon and titanium chloride; the upper limits in this case are not critical, except that when moisture level is greater than about 10% by weight of the feed, (corresponding to a water to metal chloride molar ratio of about 8.2), processing as a dry product becomes increasingly difficult, and can necessitate additional drying steps.

The indicated steps are conducted under conditions such that the basic kaolinite crystalline structure (as determined by X-ray or electron diffraction) is not altered—i.e. the kaolinite is not rendered substantially amorphous, as occurs in conventional high temperature calcining as described for example in the aforementioned McConnell et al, Proctor, and Fanselow et al patents. Heating may optionally be used to shorten the reaction time. When so used, temperatures generally will not, however, exceed about 150° C. In order to complete the polymerization and condensation which is believed to occur pursuant to the invention, it is preferable to age the resulting product for a period, typically at least three days.

The kaolin feed is preferably dry-milled prior to the reaction step with the metal chloride.

The metal chloride utilized in the invention can be one or more of the chlorides having the general formula $MCl_x$, where M is Si, Ti or Al; and x is 3 or 4 in accordance with M. The quantity of metal chloride utilized is preferably from about 20 to 35 pounds per ton of dry mixture. More generally at least 10 lbs. per ton of the metal chloride can be used, with the level selected depending upon the desired scattering improvement, except that a plateau is reached about 35 to 40 lbs/ton, above which scattering increases are very limited.

It is preferable in order to obtain high light scattering characteristics to utilize in the process of the invention a fine particle size kaolin, preferably one in which the particle size distribution is such that from about 70 to about 100% by weight of same are of less than one micrometer E.S.D. (equivalent spherical diameter). Where light scattering qualities are not a primary consideration, coarser feeds can be effectively utilized, e.g., up to 70% by weight less than 2 micrometers E.S.D.

In a further aspect of the invention, it is preferable to intermix with the kaolin feed, small quantities of an aggregation enhancing agent. Such agent is selected from one or more members of the group consisting of the alkaline earth metal carbonates or hydroxides, or lithium carbonate.

The aggregation enhancing agent mixed with the kaolin preferably should provide from about 5 to 120 millimoles of alkaline earth metal or lithium ions per 100 parts by weight of kaolin. This equates to from about 0.5 to 12% by weight kaolin of a particulate alkaline earth metal carbonate or hydroxide or lithium carbonate. Where the particularly preferred calcium carbonate or hydroxide are used, a more preferable addition range is from about 1.5 to 4% by weight of kaolin.

In a further aspect of the invention, ammonia is desirably added at addition levels of from about 8 to 16 pounds per ton of the feed mixture, the ammonia being added to the previously combined kaolin and metal chloride. Additional improvements in the products are found to occur when the steps of metal chloride and ammonia addition are sequentially repeated, following the initial sequence just mentioned.

The kaolin utilized as a feed for the invention, can be the product of wet processing, wherein various conventional beneficiation steps known to kaolin wet processing are utilized; or in accordance with a further aspect of the invention, the kaolin can be the product of air classifying a kaolin crude, preferably to at least 88% less than two micrometers—depending upon the light scattering characteristics desired in the final product.

The aggregated products of the invention are found to have a pore volume which is higher than the feed kaolin used to form same, although lower than a calcined kaolin formed from the same feed. The pore void volumes of products of the present invention when prepared from fine particle size feeds are found to range from 0.4 to 0.8 cm$^3$/g.

The products of the invention are accordingly found to have increased oil absorption in comparison to the unaggregated feed, although the oil absorption is not so high as that of a calcined kaolin prepared from the same feed. The increased oil absorption characteristics provides enhanced printing qualities in paper in which the product is incorporated.

The process of the invention, very importantly, serves to aggregate the very fine particles (i.e. the sub 0.25 micrometer particles) present in very fine feeds of the type heretofore discussed. These minute particles can indeed serve in the aggregates as bridges between larger (e.g. micrometer-sized) particles to which they are chemically bonded. Thus, one important advantage to the paper manufacturer is that the otherwise large percentages of troublesome extremely fine particles have been effectively removed as separate entities, but without the need for separation steps, together with the costly equipment required for such operations.

DESCRIPTION OF PREFERRED EMBODIMENTS

In a presently preferred method, the said structured pigment may be produced by chemically reacting a classified and pulverized kaolin to which from about 0.4 to about 12% by weight of calcium carbonate or hydroxide has been incorporated, as an aggregation enhancer, with silicon tetrachloride, the latter being intermixed with the clay at room temperature (25° C.) and at the rate of approximately 20 to 35 lbs. per ton of dry feed.

The free moisture content of the feed is preferably such as to provide a water to metal chloride molar ratio of from about 1 to 10. These levels are sufficient to hydrolyze the $SiCl_4$ to initally produce monosilicic acid, without, however, being sufficient to precipitate free silica.

The silicon tetrachloride ma be intermixed in liquid or vaporous form. The intermixing is effected by any suitable mixing apparatus capable of effecting rapid and intimate contact between the reactants. Low shear mechanical mixers, including paddle mixers and other known mixing devices, are suitable for this purpose.

The mixture of feed and silicon tetrachloride is then exposed to ammonia, e.g., by addition of gaseous ammonia at the rate of about 8 to 16 pounds per ton of feed. The ammonia serves to neutralize the acidic byproducts and contributes to the bonding process by formation of $Si_n$—$(NH)_n$ type polymers.

During mixing, a rapid initial reaction occurs between the kaolin particles and the reagents. The subsequent process of aggregation and bond formation is a relatively slow one, which levels off in about three days. Heating to temperatures of up to about 150° C. after incorporation of the reagents into the feed mixture, can help to expel volatile undesired products, but such heating is not a necessary condition for the present process, which proceeds effectively without the need for any heating.

Additional beneficiation steps can be utilized in the process prior to the intermixing of the clay with silicon tetrachloride. Such steps will be utilized depending upon the characteristics of the initial crude kaolin and upon the intended end use of the resultant product. For example, if the initial crude is already of satisfactory whiteness and brightness, and is otherwise devoid of deleterious contaminants, then minimal or no such beneficiation is necessary; i.e., in many instances mere particle size classification will suffice. Among other things, it should be appreciated that since the process of the present invention does not utilize high temperature heating as occurs during calcining, impurities which are considered highly undesirable in processing by calcining, such as glass forming oxides, are of no major concern in the present process. This indeed is one of the principal advantages of the present process, in that minimum beneficiation of the crude clay is necessary. Since no high temperature heating is utilized, the product of the invention displays an abrasion value which is in accord with the feed kaolin used in the process. Indeed typical abrasions for products of this invention are well under 15, where all abrasions are Valley abrasions determined by the Institute of Paper Chemistry Procedure 65.

Since further, the process of this invention can be carried out, as aforementioned, without substantially altering the feed material, i.e., as would result from heating to calcining temperatures, one may utilize a wide variety of crude kaolins—or more specifically one may utilize a wide variety of feed kaolins for the present process, without enormous concern for the specific impurity levels that may be present in the kaolin, such as the aforementioned glass forming oxides, iron content or the like; i.e. the primary concern is rather one with the whiteness and brightness of the feed and the abrasion properties of same.

Especially where the objective is to attain a very high scattering coefficient in the product, classification of the starting crude kaolin can be an important consideration in the present invention, since as is the case in the aforementioned McConnell et al, U.S. Pat. No. 4,381,948, the resulting aggregates possess light scattering qualities (and consequent opacity when utilized in papers) partially as a function of the fineness and uniformity of the particles which comprise the aggregates. So, for example, use of a finely classified clay fraction, one e.g. where a very high percentage of same are below 1 micrometer in equivalent spherical diameter (E.S.D.) produces an unusually excellent product in the present invention for the same reasons as are set forth in the McConnell et al patent. Classification to such a fine degree may not, however, be necessary or appropriate where the desired end product need not have unusually high light scattering or opacifying properties. Thus, more generally where classification of the kaolin crude is considered desirable, a feed fraction for the present process may be provided wherein at least 88% by weight of the particles are less than 2 micrometers ESD. Classification can be conducted by various techniques known in the art, including air classification or by aqueous classification techniques.

It should be appreciated from the foregoing that whereas excessive fines are undesirable for papermaking, as previously discussed, they are desirable in the feed used in the process of the present invention, where they serve to improve the properties of the resultant aggregates.

In some instances, the particular kaolin crude utilized may already have sufficient uniformity of particle size, and be of sufficiently fine size to begin with, that there is no essential need to effect classification; i.e. the crude in its "natural" condition is adequately classified to achieve the results discussed above. In addition, in other instances where particularly high light scattering characteristics are not an essential attribute of the final product, classification may not be required by virtue of the diminished need for high light scattering. In any event, it is found in accordance with the invention that regardless of the particular classification and size characteristics of the feed material processed by this invention, the light scattering characteristics will be improved relative to the starting material.

The brightnesses of products yielded by the invention are primarily dictated by the starting crude kaolin and by the beneficiation, if any, to which the kaolin is subjected prior to being processed in accordance with the present invention. Depending on the particular end use to which the products of the invention are to be applied, final GE brightnesses can range from 75 to over 90.

The chemical reaction step, instituted by the intermixing of the kaolin feed mix with silicon tetrachloride, is carried out by adding the silicon tetrachloride while the mixing operation proceeds. Once the intermixing operation is completed, the resultant product is aged, preferably for a period of at least 3 days, to enhance the scattering properties of the aggregated kaolin particles.

The quality of the resultant products produced by the process of the invention depend, in part, upon the physical and chemical properties of the crude kaolin serving as the source for the feed. A wide range of crude kaolins can be utilized in the invention. The crude can be processed by conventional methodology known in the art, including by so-called "dry" processing and/or by so-called "wet" processing. Where wet processing is utilized, it can be, in some cases, limited to aqueous classification. In other instances, depending upon the nature of the crude, and the product desired, additional known beneficiation techniques can be used to move undesired elements or contaminants from the kaolin. Similarly, classification can be effected as a part of the wet processing treatment. In a typical known sequence for wet processing for example, the crude can be blunged and dispersed, and then subjected e.g. by centrifuging to a particle size separation as an aqueous slurry or dispersion, from which is recovered a slurry of the clay, wherein a desired percentage of the particles are beneath a specified limit. This slurry can then be dried to produce a clay having very low moisture content, normally one wherein less than 1% moisture by weight is present. Drying in this instance is preferably effected by use of spray drying. The calcium carbonate or hydroxide addition is preferably effected by mixing in the said material prior to the spray drying.

By virtue of its relatively low cost and ready availability, silicon tetrachloride is a presently preferred reagent for use in the process of the present invention. However, other metal chlorides can be effectively utilized in the invention. More specifically, metal chlorides having the general formula $MCl_x$, where x can be 3 or 4 in accordance with M, and M is Si, Al, and/or Ti. The hydrolyzed products of the indicated metal chlorides have an appropriate structure as will enable them to fit within the crystalline tetrahedra structure of kaolin. Similarly, while calcium carbonate is a preferred aggregation enhancing agent for use in the process of the invention, other alkaline earth metal carbonates or hydroxides, or lithium carbonate, are utilizable in the invention.

A preferable range of addition for the aggregation enhancing agent is from 1.5 to 4% by weight of the feed mixture.

Coarse calcium carbonates or hydroxides are less effective in the present invention, where it is preferable rather to use the so-called paper grades of fine ground or precipitated calcium carbonate, i.e. the grades of same which are used for paper filling and paper coating. A suitable material for use in the process of the invention is the CARBITAL 50 or CARBITAL 90 product of Atlantic Carbonates of Baltimore, Md. These products have respectively particle size distribution such that 50 and 90% thereof by weight are of less than 2 microns E.S.D.

While the applicant does not wish to be bound by any specific theory of the present invention, it is hypothesized that the effectiveness of the present invention partially may result from the hydrolysis of the silcon tetrachloride, which leads to monosilicic acid, which either reacts with the kaolin surface immediately or polymerizes and then reacts with the kaolin particles. However, the immediate reaction is believed to be more likely. Addition of ammonia helps to neutralize the acid resulting from the above, first indicated reaction, and enhances the condensation reactions of the monosilicic acid. The ammonia also forms silicon-amine type polymers, which further enhance and bond the particles. Enhancement of the present process is effected by the addition of the enhancing agent metal ion, which is believed to result in the formation of metal silicates, which function as binding agents, yielding stronger aggregates, and which also helps to neutralize the acidic byproducts.

DESCRIPTION OF PREFERRED EMBODIMENTS

Figure 2:
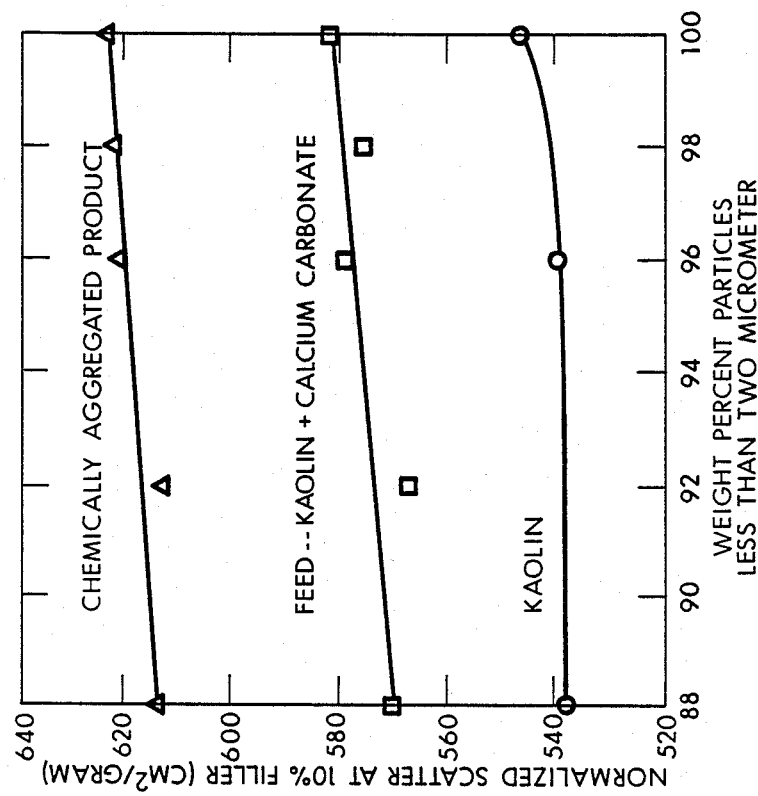
FIG. 2 is a graph, illustrating the effects upon scattering properties which result from varying the fineness of the kaolin used in the feed mix for the process of the invention.

The invention is further illustrated by the following Examples, which are to be regarded as only illustrative of the present invention, and not delimitive thereof:

Example I

For purposes of this Example, a kaolin crude was utilized as a starting material, which was derived from northeast Georgia, and which comprised a very fine particle size, material. The GE brightness f the said crude was thus in the range of 82 to 87 (in all instances in this specification it will be understood that brightness values are obtained according to the standard specification established by TAPPI procedure T-646 os-75).

The said crude was dried, micropulverized and then air classified into a fine and a coarse fraction. The fine fraction was once again micropulverized, and included approximately 97% by weight of particles having an E.S.D. (equivalent spherical diameter) of less than 1 micrometer. Particle size determinations as set forth herein are determined by Sedigraph analysis, i.e. by the instrument of such type available from Micromeritics Instrument Corporation of Norcross, Ga.

The said fine fraction was dried at about 150° C. for a period of 15 minutes to bring the moisture to about 1% or less. The dried and classified feed was thereupon loaded into a Waring blender. Liquid silicon tetrachloride was then added at the rate of 30 pounds per ton of dry clay, corresponding to approximately 1.5% by weight of the clay. This addition was carried out while the Waring blender was operating, and the silicon tetrachloride was added at the rate of about ½ ml in 25 to 30 seconds. The blender was maintained operational for an additional 1 to 2 minutes. The clay was then dried in an oven which was open to air and ambient conditions, at about 150° C. for 5 minutes. No post-milling of any type was involved in the present Example. At no point in the foregoing process were temperatures used which could alter the kaolinite crystalline structure.

The pigment product yielded by this Example was subjected to tests to determine the pigment scattering coefficient of the pigment when same was used as a filler in paper at a 10% loading factor by weight. More specifically, the pigment was tested at 10% loading in Storafite (trademark of Nova Scotia Forest Industries) bleached sulphite pulp beaten to a CSF (Canadian Standard Freeness) of 300–350. Deionized water was used in the sheet formation, together with 20 lbs/ton alum, and Percol 292 (trademark of Allied Colloids) as a retention aid. The tests thus performed showed a scattering coefficient (at 10% filler) in the general range of 555 to 560 cm$^2$/gram, the average being approximately 557 cm$^2$/gram. GE brightness was 86.3.

This 10% value was derived by nominally loading the material at 5, 10, and 15%, obtaining the sheet scatter for the three sets of sheets, fitting the points to a straight line by a least square analysis, and calculating the 10% level by the equation generated.

As a control, the aforementioned Alphatex ® product of Anglo-American Clays Corporation was used at 10% loading under otherwise identical conditions. The average scattering coefficient determined with the use of Alphatex ® was 720 to 730 cm$^2$/gram.

A further control was determined by evaluating the scattering coefficient for the starting feed material, i.e. the classified clay fraction utilized in the present Example, i.e. without the chemical aggregation. When prepared under identical conditions as aforementioned, it displayed a scattering coefficient of 528 cm$^2$/gram.

Example II

In this Example, the same general procedure was utilized as in Example I. The starting feed material, however, was a Georgia kaolin having a crude GE brightness of 87 to 88, which had been wet classified to 97% less than one micrometer E.S.D., and to 100% less than 2 micrometers E.S.D., and spray-dried. The procedure utilized in adding the metal chloride and evaluating the samples were similar to that of Example I, and two further metal chlorides were evaluated, i.e., titanium chloride and anhydrous aluminum chloride. The pigment products yielded in this Example were subjected to tests in accordance with the procedure of Example I, and the scattering coefficients were evaluated at 10% filler level. Samples of the aforementioned Alphatex ® were also evaluated for comparison, and samples of the same feed were also evaluated as fillers without being subjected to the aggregation process of the invention. It was found that the untreated samples produced a scattering coefficient of 540 cm$^2$/gram. The product prepared with silicon tetrachloride had a scattering coefficient of 555 cm$^2$/gram, the product prepared with titanium chloride a scattering cross-section of 556 cm$^2$/gram; and the product prepared with aluminum chloride, a scattering cross-section of 548 cm$^2$/gram. The Alphatex ® product had a scattering of 689 cm$^2$/gram.

Example III

The crude used in this Example was the same as that of Example I, except that the crude was wet-classified to 96% less than 2 micrometers to provide the feed for testing. The said feed samples were processed with silicon tetrachloride according to the procedure of Example I, except that following the intermixing of the feed with silicon tetrachloride the mixture was exposed to a slight vacuum and was then reacted with 12 pounds of gaseous ammonia per ton of clay. The sequence of silicon tetrachloride and ammonia addition was repeated, and the resultant product dried at 150° C.

For comparison, identical samples were processed as indicated, except that no ammonia was added. Table I sets forth scatter levels achieved at 10% filler level for the two sets of samples. In this and subsequent Examples, all scattering data are normalized by comparison to the scattering coefficient of samples of the aforementioned Alphatex ®. Ideally in a study of the present nature, the same batch of beaten pulp should be used throughout. As this is not practical, the method adopted was to fill one set of sheets in each series of tests using the same Alphatex ® from series to series. Statistically, the Alphatex ® filled samples at 10% filler had a scattering coefficient of 700 cm$^2$/gram, and in each series in which Alphatex ® differed from 700, the scattering coefficients of the experimental samples were accordingly adjusted proportionally to the adjustments which the Alphatex ®-containing paper required to bring its value to 700 cm$^2$/gram. This procedure, which was used in subsequent examples, is from time to time referred to in the specification as "normalizing" the scattering coefficients.

It is seen that the addition of the ammonia yielded significant further increases in the light scattering properties of the final product. In particular, the scatter at 10% filler level was well over 570 cm$^2$/gram.

In general, it has been found that repeating the metal chloride treatment increases scattering coefficient by about 10 units, while repeating the metal chloride, ammonia treatment sequence, as was done in this Example, enhances the light scattering coefficient by about 15 units.

TABLE I

| | COMPARATIVE SCATTER DATA | |
|---|---|---|
| Sample | Scatter Coefficient at 10% Filler Level for Product Without NH$_3$ | Scatter Coefficient at 10% Filler Level for Product With NH$_3$ |
| 1 | 560 cm$^2$/g | 576 cm$^2$/g |
| 2 | 556 | 578 |
| 3 | 551 | 573 |
| 4 | 559 | 573 |

Example IV

The crude kaolin utilized in this Example was a blend of northeast Georgia Kaolins of fine particle size and G.E. brightness of about 87. The said crude was wet-classified to less than 2 micrometers, and was then processed in a manner substantially identical to the samples of Example III, except that the metal chloride was titanium chloride, which was added at a dosage rate of 20 pounds per ton of feed clay. Ammonia was added as in Example III. The resultant products were then evaluated at 10% filler as aforementioned. It was found that the scatter levels achieved at the mentioned filler level was 544 cm$^2$/g. A control sample not subjected to the process of the invention, displayed a scatter of 522 cm$^2$/g when similarly processed.

Example V

Feed clays were prepared as described in Example II. These clays were treated with various rapidly hydrolyzing metal chlorides, at addition levels of 30 lbs/ton of clay. The chlorides used were titanium tetrachloride, anhydrous aluminum chloride, and silicon tetrachloride, as described in Example III. Aggregation was found to occur with all of these metal chlorides. A control sample of feed, which was not subjected to the process of the invention, displayed scatter of 522 cm$^2$/g. Utilizing the process of the invention and the procedure of Example IV, provided a scatter at 10% filler of 565 cm²/gram with silicon tetrachloride, and 556 cm²/gram with titanium chloride. Utilizing a different pulp which exhibited a control scattering of 526 cm²/gram, the process of the invention (practiced as in Example IV) and using aluminum chloride, produced a product having a scatter of 536 cm²/gram.

Example VI

The same crude kaolin as in Example I was used to prepare feed samples as in Example III. Moisture levels in the final feed were adjusted to be in the range of 0.05% to 3.0% by weight, and the resultant samples were evaluated as in Example I. The scattering coefficient improvements at 10% loading were evaluated, and are shown in Table II as a function of moisture levels. The Table sets forth in the increase in scattering over that yielded by an untreated sample of feed kaolin.

TABLE II

Improvement of Scattering Coefficient as a Function of Moisture Level of the Feed Kaolin

| Percentage Moisture | Water/SiCl₄ Molar Ratio | Increase in Scattering Coefficient at 10% Filler Compared to Scatter of Untreated Feed Kaolin |
| --- | --- | --- |
| 0.05 | 0.16 | 3 |
| 0.85 | 2.68 | 24 |
| 1.15 | 3.62 | 8 |
| 3.00 | 9.44 | 7 |

Example VII

In this Example, the kaolin feed was a blend of two fine northeastern Georgia Kaolins. The feed was wet-classified to 96% less than 2 micrometers. The beneficiated, spray-dried and pulverized feed kaolin was mixed with 3% calcium carbonate dry weight, in slurry form, The calcium carbonate was a paper coating grade having a 90% less than 2 micrometers by weight P.S.D. The feed mixture was dried at 150° C. for 5 minutes, to bring the moisture level to about 0.7%, and pulverized once more. Samples of this feed were treated with silicon tetrachloride and ammonia, and other samples with titanium chloride and ammonia according to Example IV. The resultant products displayed at 10% filling, light scattering of 588 and 576 cm²/gram, respectively for the silicon tetrachloride and for the titanium tetrachloride prepared products. The untreated feed samples for the SiCl₄ test had a scatter of 528, and for the TiCl₄ had a scatter of about 522 cm²/g.

Example VIII

Figure 1:
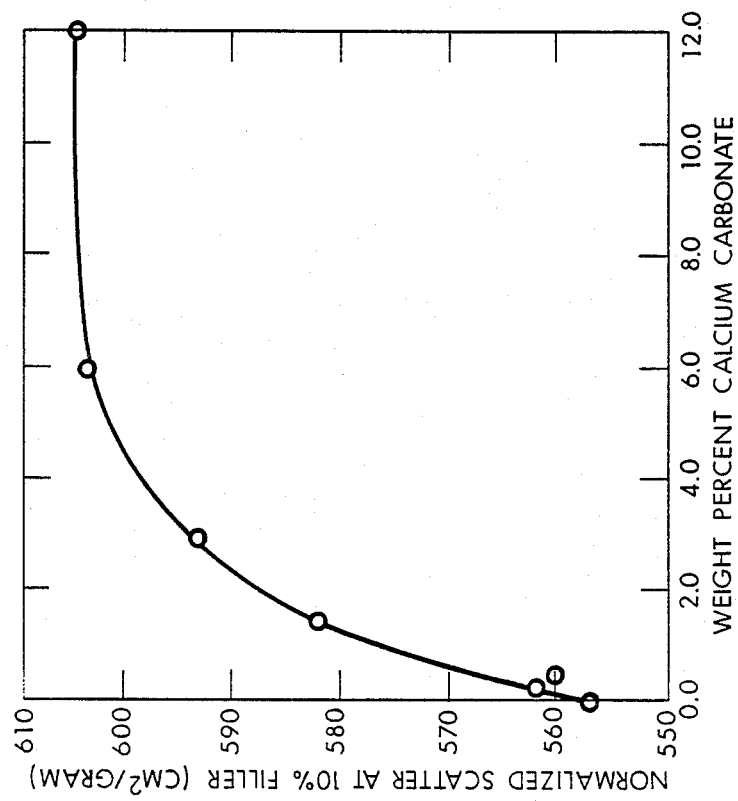
FIG. 1 is a graph, illustrating the effects upon scattering properties which result from varying the level of aggregation enhancing agent in the feed mix for the process of the invention.

Feed kaolins were prepared as in Example VII, incorporating varying amounts of the aforementioned calcium carbonate in the range of from about 0 to 12% by weight of the total feed mixture. The calcium carbonate used was in 75% solids slurry form. The light scatter improved with the level of calcium carbonate addition, and is depicted in the graph of FIG. 1, which shows scatter coefficient as a function of calcium carbonate addition level.

Example IX

The procedure described in Example VIII was repeated with varying dosages of the silicon tetrachloride, ranging from 15 lbs/ton to 35 lbs/ton of feed. For a given feed clay, aggregation and light scatter was found to increase with the amount of silicon tetrachloride utilized. The feed containing 3% calcium carbonate had a resultant light scatter when used at 10% filler of 585 and 610 cm²/gram when treated with 15 and 30 lbs/ton silicon tetrachloride, respectively. The scatter was found to be somewhat further improved by application of much higher dosage levels. Thus, at 300 lbs/ton of silicon tetrachloride, scatter at 10% filling was 630 cm²/gram.

Example X

The procedure described in Example VII was repeated utilizing calcium carbonate of various fineness of particle sizes in the range of 10% less than 2 micrometers by weight to 90% less than 2 micrometers by weight. In general, it was found that in this range of calcium carbonate particle size there was little variation in achieved scatter improvement—the scattering coefficient improvements due to the addition of the CaCO₃ ranged from about 35 to 55 units. For paper industry applications, it is, however, preferable to use a finer grade of calcium carbonate, typically 90% less than 2 micrometers, to reduce abrasion in the event any residual materials remain in the final product of the invention.

Example XI

A series of samples were prepared using starting kaolin crudes and general procedures as in Example VII, and various aggregation enhancing agents were used, including calcium hydroxide, barium carbonate, magnesium carbonate, and lithium carbonate. In each instance, the enhancing agent was added at 3% dosage level, and the test samples were processed and evaluated as in the procedures in Example VII. The resulting data appear in Table III below.

TABLE III

| Aggregation Enhancing Agent | Scattering Coefficient at 10% Filler Level |
| --- | --- |
| Calcium Hydroxide | 581 |
| Barium Carbonate | 600 |
| Magnesium Carbonate | 591 |
| Lithium Carbonate | 599 |

Example XII

In order to illustrate the effects of feed particle size on the resultant products of the invention, feed kaolins derived from the crudes used in Example IV were wet-classified in the range of 88% less than 2 micrometers to 100% less than 2 micrometers. The classified feeds were then spray-dried, blended with 3% calcium carbonate slurry, and subjected to reactants according to the procedure of Example VII. The uppermost curve in FIG. 2 depicts the variation in scattering properties as a function of particle size. Scatter generally increased with the fineness of the feed clay. It will be noted, however, that even with a somewhat coarser feed (e.g. 88% less than 2 micrometers) good results are achieved. For comparison, scatter coefficients for the kaolin without the added calcium carbonate, and for the feed kaolin containing the calcium carbonate, are also shown.

Example XIII

The process of the present invention is one which provide porous structured aggregates. Aggregates thus produced by the procedures of Examples I and IV were analyzed for pore void volume by use of mercury porosimetry. The sample with higher measured porosity was deemed to have the higher intra-aggregate pore void volume. Results are set forth in Table IV. The scatters were in the range of 585 to 630 cm²/g and pore void volume ranged from about 0.4 to 0.7 cm³/g.

TABLE IV

| Sample No. | Procedure | Aggregated Pore Void Volume in cm³/g | Scatter at 10% Filling in cm²/g |
|---|---|---|---|
| 1 | Example IV | 0.635 | 623 |
| 2 | Example IV | 0.685 | 630 |
| 3 | Example I | 0.378 | 585 |
| 4 | Example I | 0.530 | 608 |
| 5 | Example IV | 0.660 | 606 |

Example XIV

The same feed as described in Example VII, was milled several times, specifically 2 to 8 times, using a Microsample mill product of Mikropul Corporation of Summit, N.J. The resultant feed samples were treated by the procedure of Example VII. It was found that increasing the number of passes through the mill led to enhanced light scatter for the aggregated products. Specifically, utilizing 2, 4, 6 and passes, provided light scatter respectively of 583, 595, 598 and 606 cm²/gram.

Example XV

This Example illustrates the effects of aging upon the resultant products of the invention. In particular, structured kaolin products prepared by the procedure of Example III, were allowed to age for various lengths of time, after which the light scattering increases were evaluated at a 10% filler level. In preparing the samples no heating or drying was utilized but simply the aging of the intermixed metal chloride and feed. The light scatter was found to increase with time, and reached a plateau level after approximately three days. Specifically, scatter in a representative sample increased from 585 to 600 cm²/gram, by increasing the aging period of the product from 1 day to 3 days at room temperature.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

We claim:

1. A process for producing a structured kaolin pigment having enhanced light scattering and opacifying properties when incorporated in paper; said process comprising the steps of:
    (a) forming a feed mixture of a fine particle size kaolin; and
    (b) chemically reacting said feed mixture in particulate form with a metal chloride having the general formula $MCl_x$, where M is Si, Al or Ti; and x is 3 or 4 in accordance with M, to aggregate the kaolin particles to form the structured pigment;
    the moisture level present in the said feed mixture reacted in step (b) being sufficient to at least partially hydrolyze the metal chloride; and
    steps (a) and (b) being conducted under conditions such that the basic kaolinite crystalline structure is not altered.

2. A process for producing a structured kaolin pigment having enhanced light scattering and opacifying properties when incorporated in paper; said process comprising the steps of:
    (a) forming a feed mixture of a fine particle size kaolin; and
    (b) aggregating the kaolin particles to form the structured pigment, by combining said feed mixture in particulate form with a metal chloride having the general formula $MCl_x$ where M is Si, Al or Ti, and x is 3 or 4 in accordance with M; and then adding ammonia to the combined feed mixture and metal chloride;
    the moisture level present in the said feed mixture reacted in step (b) being sufficient to at least partially hydrolyze the metal chloride; and
    steps (a) and (b) being conducted under conditions such that the basic kaolinite crystalline structure is not altered.

3. A process for producing a structured kaolin pigment having enhanced light scattering and opacifying properties when incorporated in paper; said process comprising the steps of (a) forming a feed mixture of a fine particle size kaolin together with an aggregation enhancing agent selected from one or more members of the group consisting of any alkaline earth metal carbonate or hydroxide, and lithium carbonate, the enhancing agent being present in quantities to provide from about 5 to 120 millimoles of the enhancing agent metal ion species per 100 parts by weight of kaolin; and
    (b) chemically reacting said feed mixture in particulate form with a metal chloride having the general formula $MCl_x$, where M is Si, Al or Ti; and x is 3 or 4 in accordance with M, to aggregate the kaolin particles to form the structured pigment;
    the moisture level present in the said feed mixture reacted in step (b) being sufficient to at least partially hydrolyze the metal chloride; and
    steps (a) and (b) being conducted under conditions such that the basic kaolinite crystalline structure is not altered.

4. A process for producing a structured kaolin pigment having enhanced light scattering and opacifying properties when incorporated in paper; said process comprising the steps of:
    (a) forming a feed mixture of a fine particle size kaolin together with an aggregation enhancing agent selected from one or more members of the group consisting of any alkaline earth metal carbonate or hydroxide, and lithium carbonate, the enhancing agent being present in quantities to provide from about 5 to 120 millimoles of the enhancing agent metal ion species per 100 parts by weight of kaolin; and
    (b) aggregating the kaolin particles to form the structured pigment, by combining said feed mixture in particulate form with a metal chloride having the general formula $MCl_x$ where M is Si, Al or Ti, and x is 3 or 4 in accordance with M; and then adding ammonia to the combined feed mixture and metal chloride;
    the moisture level present in the said feed mixture reacted in step (b) being sufficient to at least partially hydrolyze the metal chloride; and
    steps (a) and (b) being conducted under conditions such that the basic kaolinite crystalline structure is not altered.

5. A method in accordance with claims 1, 2, 3 or 4 wherein said metal chloride comprises silicon tetrachloride; and wherein the moisture level in said feed is below that at which the predominant hydrolysis product is silica.

6. A method in accordance with claims 1, 2, 3 or 4 including the step of heating the reactants in step (b) to temperatures not higher than 150° C.

7. A method in accordance with claims 1, 2, 3 or 4 including the steps of aging the product of step (b) for a period of at least three days to enhance the scattering properties of the aggregated kaolin particles.

8. A method in accordance with claims 1, 2, 3 or 4, wherein said kaolin has a particle size distribution such that from about 70 to 100% by weight thereof is of less than 2 micrometers ESD.

9. A method in accordance with claims 1, 2, 3 or 4, wherein the feed mixture subjected to step (b) has a free moisture content such as to provide a water to metal chloride molar ratio of from about 1 to 10.

10. A method in accordance with claims 1, 2, 3 or 4, wherein said kaolin utilized in step (a) is the product of air classifying a kaolin crude clay to at least as fine as 88% less than 2 microns.

11. A method in accordance with claims 3 or 4, wherein said aggregation enhancing agent comprises from about 0.4 to about 12% by weight of the kaolin, of a particulate alkaline earth metal carbonate or hydroxide.

12. A method in accordance with claim 11, wherein said enhancing agent comprises calcium carbonate.

13. A process in accordance with claim 12 wherein the feed mixture of kaolin and calcium carbonate is dry-milled prior to step (b).

14. A process in accordance with claim 13, wherein the said feed mixture is dry-milled by repetitive passes through a mill.

15. A method in accordance with claims 2 or 4, wherein said ammonia is added at levels from about 8 to 16 lbs/ton of feed mix.

16. A method in accordance with claim 15, wherein the steps of metal chloride and ammonia addition are sequentially repeated.

17. A method in accordance with claims 1 or 3, wherein the step of metal chloride addition is sequentially repeated.

18. A structured kaolinitic pigment, comprising porous aggregates of kaolin particles which are chemically inorganically bonded to one another, by the process of any of claims 1, 2, 3 or 4; and said aggregates having a kaolinite crystalline structure, as determined by X-ray or electron diffraction.

19. A method in accordance with claims 1, 2, 3 or 4, wherein the feed mixture subjected to step (b) has a free moisture content such as to provide a water to metal chloride ratio of less than about 50.

* * * * *